US011065981B2

(12) United States Patent
Kim et al.

(10) Patent No.: US 11,065,981 B2
(45) Date of Patent: Jul. 20, 2021

(54) AIR-CONDITIONING APPARATUS FOR ELECTRIC VEHICLE AND METHOD OF CONTROLLING SAME

(71) Applicants: Hyundai Motor Company, Seoul (KR); Kia Motors Corporation, Seoul (KR)

(72) Inventors: Jae Woong Kim, Hwaseong-si (KR); So Yoon Park, Suwon-Si (KR); Man Ju Oh, Yongin-Si (KR); Sang Shin Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 102 days.

(21) Appl. No.: 16/194,725

(22) Filed: Nov. 19, 2018

(65) Prior Publication Data
US 2020/0031249 A1 Jan. 30, 2020

(30) Foreign Application Priority Data
Jul. 25, 2018 (KR) .......................... 10-2018-0086582

(51) Int. Cl.
*B60L 58/24* (2019.01)
*B60H 1/00* (2006.01)
(Continued)

(52) U.S. Cl.
CPC .......... *B60L 58/24* (2019.02); *B60H 1/00028* (2013.01); *B60H 1/00042* (2013.01);
(Continued)

(58) Field of Classification Search
CPC .......... B60L 1/003; B60L 1/02; B60L 3/0023; B60L 2240/34; B60L 5/24;
(Continued)

(56) References Cited

U.S. PATENT DOCUMENTS

2002/0007636 A1* 1/2002 Hay ........................ F01K 25/08
60/618
2010/0186440 A1* 7/2010 Hong ...................... F28D 7/103
62/434
(Continued)

FOREIGN PATENT DOCUMENTS

JP 5381815 B2 1/2014
JP 2017185919 A * 10/2017 ............... B60H 1/08
(Continued)

OTHER PUBLICATIONS

Machine Translation JP2017185919A (Year: 2017).*

*Primary Examiner* — Len Tran
*Assistant Examiner* — Gustavo A Hincapie Serna
(74) *Attorney, Agent, or Firm* — Morgan, Lewis & Bockius LLP (57) ABSTRACT

An air-conditioning apparatus for an electric vehicle and a method of controlling the same, may include a heat exchanger performing heat exchange between a first fluid and a second fluid while the first fluid and the second fluid flow separately from each other therethrough; a heat source connected to the heat exchanger through a line through which the second fluid flows to allow the second fluid to circulate between the heat exchanger and the heat source, and heating or cooling the second fluid; a circulator imparting a circulation force to the second fluid such that the second fluid circulates between the heat exchanger and the heat source; and a controller determining a required flow rate of the second fluid by use of a flow rate of the first fluid flowing through the heat exchanger and controlling the circulator on the basis of the required flow rate of the second fluid.

7 Claims, 3 Drawing Sheets

(51) Int. Cl.
*H01M 10/625* (2014.01)
*H01M 10/663* (2014.01)
*H01M 10/61* (2014.01)

(52) U.S. Cl.
CPC ......... *H01M 10/61* (2015.04); *H01M 10/625* (2015.04); *H01M 10/663* (2015.04); *B60H 2001/0015* (2013.01); *B60H 2001/00128* (2013.01); *B60H 2001/00185* (2013.01); *B60L 2240/34* (2013.01); *B60L 2240/36* (2013.01)

(58) Field of Classification Search
CPC ............ B60H 1/00007; B60H 1/00028; B60H 1/00042; B60H 1/00392; B60H 1/00864; B60H 1/00885; B60H 2001/00128; B60H 2001/0015; B60H 2001/00185; H01M 10/61; H01M 10/625; H01M 10/663; Y02T 10/70
USPC ....................................................... 165/202
See application file for complete search history.

(56) References Cited

U.S. PATENT DOCUMENTS

| | | | | |
|---|---|---|---|---|
| 2010/0262301 | A1* | 10/2010 | Schwartz | B60K 6/405 700/282 |
| 2011/0214627 | A1* | 9/2011 | Nishikawa | F01P 7/164 123/41.02 |
| 2012/0304944 | A1* | 12/2012 | Nelson | F01P 5/043 123/41.12 |
| 2013/0098102 | A1* | 4/2013 | Nakayama | F25B 30/02 62/510 |
| 2016/0001636 | A1* | 1/2016 | Terada | F25B 5/02 62/160 |
| 2016/0101666 | A1* | 4/2016 | Sugimura | B60H 1/321 165/202 |
| 2016/0109163 | A1* | 4/2016 | Enomoto | F25B 13/00 62/160 |
| 2016/0161143 | A1* | 6/2016 | Wegner | F24H 1/225 122/14.2 |
| 2016/0178548 | A1* | 6/2016 | Berry | H02K 9/24 165/287 |
| 2016/0297283 | A1* | 10/2016 | Sakamoto | B60H 1/32281 |
| 2016/0332505 | A1* | 11/2016 | Yamanaka | B60H 1/00428 |
| 2018/0086174 | A1* | 3/2018 | Bidner | F01P 11/16 |
| 2018/0141410 | A1* | 5/2018 | Kami | B60H 1/00921 |
| 2018/0339574 | A1* | 11/2018 | Sugimura | B60H 1/323 |
| 2019/0118613 | A1* | 4/2019 | Ragazzi | B60H 1/00392 |
| 2019/0277201 | A1* | 9/2019 | Veilleux, Jr. | F02C 9/28 |
| 2019/0309656 | A1* | 10/2019 | Liu | F01K 23/065 |
| 2019/0344635 | A1* | 11/2019 | Stacey | B60H 1/06 |

FOREIGN PATENT DOCUMENTS

| | | |
|---|---|---|
| JP | 2017185919 A | 10/2017 |
| KR | 20020017456 A | 3/2002 |
| KR | 101448656 B1 | 10/2014 |

* cited by examiner

AIR-CONDITIONING APPARATUS FOR ELECTRIC VEHICLE AND METHOD OF CONTROLLING SAME

CROSS REFERENCE TO RELATED APPLICATION

The present application claims priority to Korean Patent Application No. 10-2018-0086582, filed Jul. 25, 2018, the entire contents of which is incorporated herein for all purposes by this reference.

BACKGROUND OF THE INVENTION

Field of the Invention

The present invention relates to an air-conditioning apparatus for an electric vehicle and a method of controlling the same, wherein a first fluid provided for air conditioning is heat exchanged with a second fluid while a flow rate of the second fluid is variably controlled, effectively improving heating or cooling efficiency of the first fluid.

Description of Related Art

Recently, electric vehicles are considered to be a solution for implementation of environmentally friendly technologies that solve environmental problems such as energy depletion. An electric vehicle utilizes an electric motor powered by electricity from batteries. In general, electric vehicles have no carbon dioxide emission and have low noise emission while energy efficiency of an electric motor is higher than that of an internal combustion engine, and thus are attracting attention as environmentally friendly vehicles.

A key technology for implementing such an electric vehicle is a technology related to a battery module. Recently, research on weight reduction, size reduction, and short charging time of a battery has been actively conducted. The battery module is designed to maintain optimal performance and long service life when used in an optimal temperature environment. However, it is difficult to use in the optimal temperature environment due to heat generated while driving and due to a change in external temperature.

Furthermore, an electric vehicle does not have an additional waste heat source generated during combustion in an engine such as an internal combustion engine, and thus utilizes an electric heating device to perform vehicle internal heating in winter. Furthermore, it is required to heat the vehicle to improve charging/discharging performance of a battery in cold winter, so an additional cooling water type electric heater is used. That is, to maintain the optimal temperature environment of the battery module, a cooling and heating system for controlling temperature of the battery module is adopted to additionally operate with a heating and cooling system for vehicle internal air conditioning. In other words, two independent cooling and heating systems are constructed such that one of the systems is used for vehicle internal cooling and heating while a remaining one is used for temperature control of the battery module.

On the other hand, for efficiently performing heating in an electric vehicle, a heater core is provided inside a heating, ventilation, and air conditioning (HVAC) housing. The heater core performs heat exchange between cooling water heated by a heater and air flowing inside the HVAC housing, increasing the temperature of air used for air conditioning.

A water pump is mounted on a cooling water line passing through the heater core and the heater to secure a flow rate of cooling water. Conventionally, the water pump is provided to operate only at a predetermined RPM, leading to high energy and time consumption to heat water to a desired temperature depending on the situation.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air-conditioning apparatus configured for an electric vehicle and a method of controlling the same, wherein a flow rate of a first fluid which is heat exchanged with a second fluid is variably controlled on the basis of a flow rate of the first fluid, effectively improving heating or cooling efficiency of the first fluid.

According to various aspects of the present invention, there is provided an air-conditioning apparatus configured for an electric vehicle, including: a heat exchanger performing heat exchange between a first fluid and a second fluid while the first fluid and the second fluid flow separately from each other through the heat exchanger; a heat source connected to the heat exchanger through a line through which the second fluid flows and allowing the second fluid to circulate between the heat exchanger and the heat source, the heat source heating or cooling the second fluid; a circulator imparting a circulation force to the second fluid such that the second fluid circulates between the heat exchanger and the heat source; and a controller determining a required flow rate of the second fluid by use of a flow rate of the first fluid flowing through the heat exchanger and controlling the circulator on the basis of the required flow rate of the second fluid.

The controller may be configured to determine a driving amount of the heat source on the basis of at least one of a temperature difference between a current inlet temperature and a desired discharge temperature of the first fluid with respect to the heat exchanger, the flow rate of the first fluid, and the flow rate of the second fluid, and may control the heat source on the basis of the determined driving amount.

The first fluid may be air used for air conditioning, the heat exchanger may be a heater core for vehicle internal air conditioning through which the second fluid flows, the heat source may be a heater, and the circulator may be a pump.

According to various aspects of the present invention, there is provided a method of controlling the air-conditioning apparatus configured for the electric vehicle, the method including: determining the flow rate of the first fluid flowing through the heat exchanger; determining the required flow rate of the second fluid using the flow rate of the first fluid flowing through the heat exchanger by use of a data map, with the flow rate of the first fluid as an input and the required flow rate of the second fluid as an output; and controlling a level of operation of the circulator according to the required flow rate of the second fluid.

The required flow rate of the second fluid may be determined to be a value proportional to the flow rate of the first fluid by use of the data map.

The required flow rate of the second fluid may be determined as a flow rate value at which a time consumed for a current discharge temperature of the first fluid to reach a desired discharge temperature according to the flow rate of the first fluid with respect to the heat exchanger is shortest.

The method may further include determining a driving amount of the heat source on the basis of at least one of a temperature difference between a current inlet temperature and a desired discharge temperature of the first fluid with respect to the heat exchanger, the flow rate of the first fluid, and the flow rate of the second fluid, and driving the heat source on the basis of the determined driving amount.

The driving the heat source may include: determining a desired discharge temperature of the second fluid with respect to the heat source on the basis of the temperature difference between the current inlet temperature and the desired discharge temperature of the first fluid with respect to the heat exchanger, on the basis of the flow rate of the first fluid, and on the basis of the flow rate of the second fluid; determining the driving amount of the heat source on the basis of the desired discharge temperature of the second fluid with respect to the heat source; and driving the heat source on the basis of the determined driving amount.

The desired discharge temperature of the second fluid with respect to the heat source may be determined by multiplying the first rate of the first fluid, a specific heat of the first fluid, and the temperature difference between the current inlet temperature and the desired discharge temperature of the first fluid with respect to the heat exchanger, dividing a value that results from multiplication by the flow rate of the second fluid and a specific heat of the second fluid, and adding a value that results from division to a current inlet temperature of the second fluid.

The driving amount of the heat source may be determined by use of a data map, with the flow rate of the first fluid and the temperature difference between the current inlet temperature and the desired discharge temperature of the first fluid with respect to the heat exchanger as an input and the driving amount of the heat source as an output.

The method may further include after the driving the heat source, controlling an opening ratio of a temperature control door on the basis of a temperature difference between a current discharge temperature and the desired discharge temperature of the first fluid with respect to the heat exchanger, the temperature control door being provided at an upstream side of the heat exchanger in a line through which the first fluid flows.

The method may further include, when a vehicle failure signal is generated or when vehicle internal air conditioning is required to be stopped, stopping operations of the heat source and the circulator and controlling to stop the vehicle internal air conditioning.

According to the air-conditioning apparatus configured for the electric vehicle and the method of controlling the same, it is possible to variably control the flow rate of the second fluid on the basis of the flow rate of the first fluid to thereby effectively reduce energy and time consumed for the second fluid to reach a desired temperature by the heater.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

It is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinbelow, an air-conditioning apparatus configured for an electric vehicle according to exemplary embodiments of the present invention will be described in detail with reference to the accompanying drawings. Throughout the drawings, the same reference numerals will refer to the same or like parts.

Figure 1:
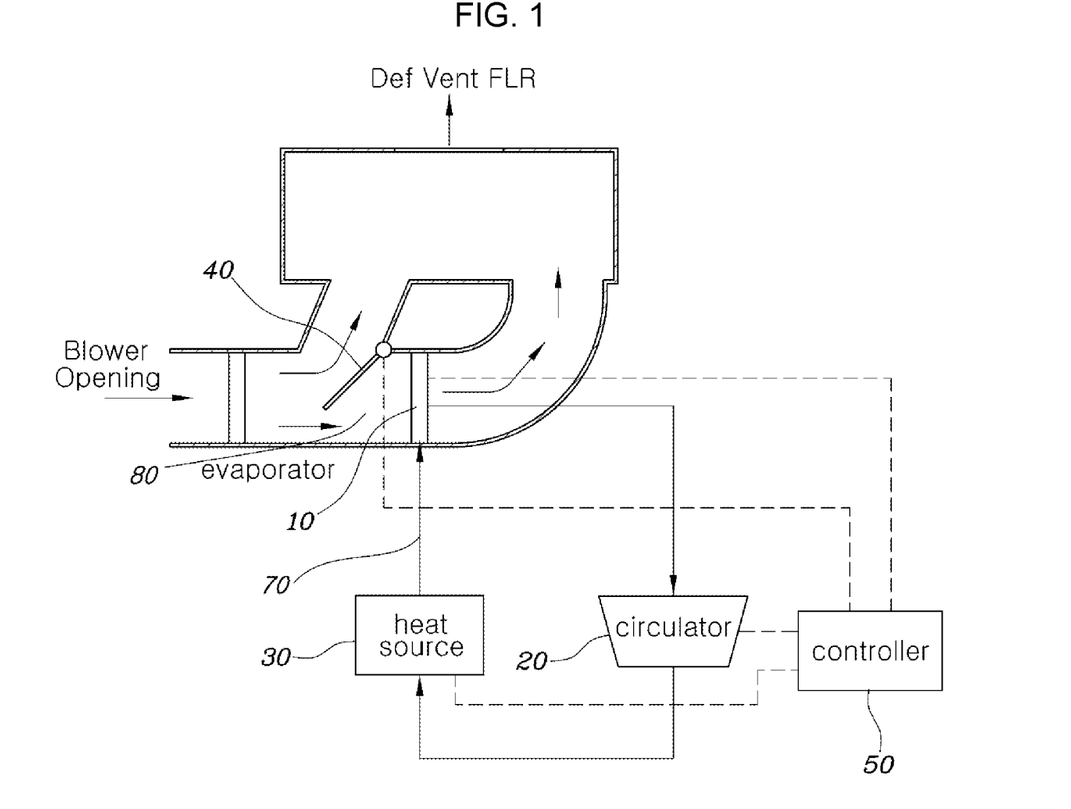
FIG. 1 is a view showing an air-conditioning apparatus configured for an electric vehicle according to an exemplary embodiment of the present invention.
Figure 3:
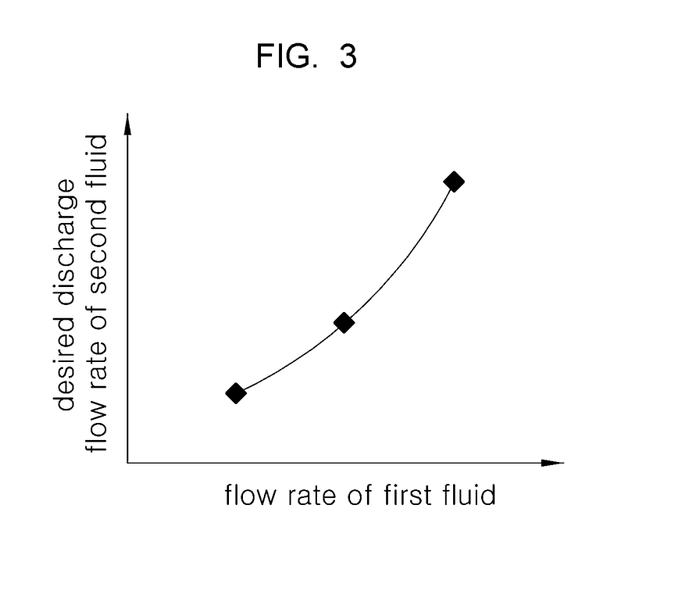
FIG. 3 is a data map showing a required flow rate of a second fluid according to a flow rate of a first fluid.
Figure 4:
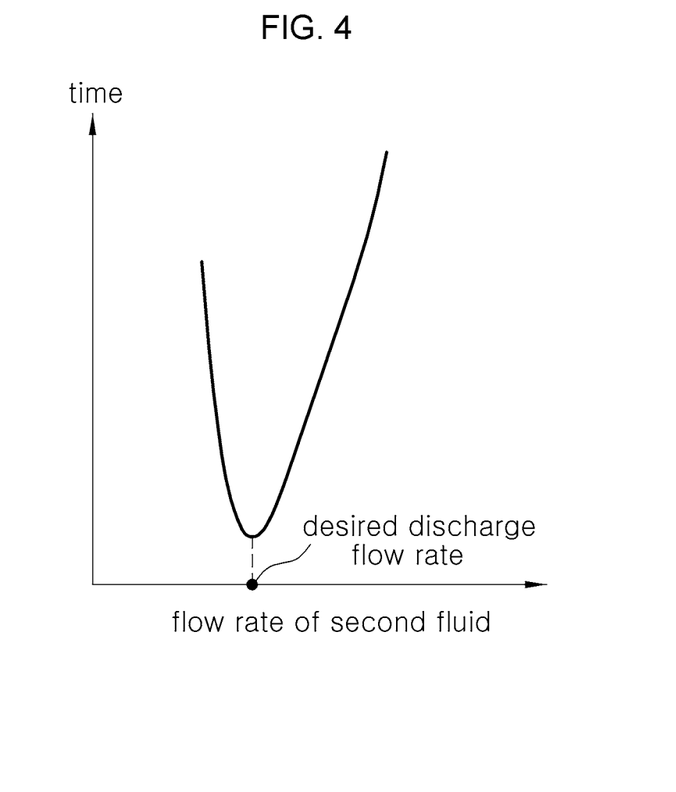
FIG. 4 is a graph showing a time required for the first fluid to reach a desired discharge temperature according to a flow rate of the second fluid.

FIG. 1 is a view showing an air-conditioning apparatus configured for an electric vehicle according to an exemplary embodiment of the present invention, FIG. 3 is a data map showing a required flow rate of a second fluid according to a flow rate of a first fluid, and FIG. 4 is a graph showing a time required for the first fluid to reach a desired discharge temperature according to a flow rate of the second fluid.

Referring to FIG. 1, an air-conditioning apparatus configured for an electric vehicle according to an exemplary embodiment of the present invention may include a heat exchanger 10 performing heat exchange between a first fluid and a second fluid while the first fluid and the second fluid flow separately from each other through the exchanger; a heat source 30 connected to the heat exchanger 10 through a line through which the second fluid flows and allowing the second fluid to circulate between the heat exchanger 10 and the heat source 30, the heat source heating or cooling the second fluid; a circulator 20 imparting a circulation force to the second fluid such that the second fluid circulates between the heat exchanger 10 and the heat source 30; and a controller 50 determining a required flow rate of the second fluid by use of a flow rate of the first fluid flowing through the heat exchanger 10 and controlling the circulator 20 on the basis of the required flow rate of the second fluid.

In other words, the first fluid is a fluid flowing for air conditioning of an electric vehicle, and the second fluid is another fluid flowing separately from the first fluid.

The heat exchanger 10 according to an exemplary embodiment of the present invention is a device that heats or cools the first fluid flowing for air conditioning of an electric vehicle to a desired temperature through heat exchange with the second fluid. Herein, precise temperature control of the second fluid to be heat-exchanged is necessary for the temperature of the first fluid to converge to the desired temperature.

To the present end, in an exemplary embodiment of the present invention, the heat source 30 is mounted on the line 70 through which the second fluid flows to heat or cool the second fluid. Furthermore, the circulator 20 is mounted on the line 70 through which the second fluid flows to provide the circulation force to the second fluid such that the second fluid flows efficiently between the heat exchanger 10 and the heat source 30.

In such a system, an element acting as a control variable for the temperature of the first fluid to converge to the desired temperature includes a flow rate of the second fluid as well as the temperature of the second fluid.

Accordingly, in an exemplary embodiment of the present invention, the controller 50 determines the required flow rate of the second fluid to be provided from the circulator 20 on the basis of the flow rate of the first fluid flowing through the heat exchanger 10 and thereby provides the circulation force.

Referring to FIG. 3, it may be seen that a desired discharge flow rate of the second fluid to be discharged through the circulator 20 increases according to the flow rate of the first fluid flowing through the heat exchanger 10. Using the present data map, the controller 50 determines the desired discharge flow rate of the second fluid on the basis of the flow rate of the first fluid.

This is because, referring to FIG. 4, a time consumed for the first fluid to reach the desired temperature varies as the flow rate of the second fluid varies in a state where the flow rate of the first fluid is fixed.

In other words, when the flow rate of the second fluid is excessively small, the amount of the second fluid to be heat-exchanged with the first fluid decreases, causing an increase in the time consumed for the first fluid to reach the desired temperature. On the other hand, when the flow rate of the second fluid is excessively large, the amount of the second fluid to be heat-exchanged with the first fluid increases whereas a time consumed for the second fluid itself to be heated or cooled increases, causing an increase in the time consumed for the first fluid to reach the desired temperature.

Thus, the circulation force is provided to cause the circulator 20 to discharge an appropriate flow rate of the second fluid, whereby it is possible to minimize time and energy consumed for the temperature of the first fluid to converge to the desired temperature.

Furthermore, the controller 50 determines a driving amount of the heat source 30 on the basis of at least one of a temperature difference between a current inlet temperature and a desired discharge temperature of the first fluid with respect to the heat exchanger 10, the flow rate of the first fluid, and the flow rate of the second fluid, and controls the heat source 30 on the basis of the determined driving amount.

In other words, the driving amount of the heat source 30 heating or cooling the second fluid is also included in the control variable to enable the temperature of the first fluid to accurately converge to the desired discharge temperature. Herein, when the driving amount of the heat source 30 is not appropriate, a time consumed for the first fluid to be heated or cooled to the desired temperature may increase, or the first fluid may be excessively heated or cooled to more than the desired temperature. Thus, it is preferable to determine an accurate driving amount of the heat source 30.

In an exemplary embodiment of the present invention, the driving amount of the heat source 30 is determined by varying the temperature difference between the current inlet temperature and the desired discharge temperature of the first fluid with respect to the heat exchanger 10. In other words, when the temperature difference is large, the first fluid is rapidly heated or cooled only when the driving amount of the heat source 30 is large. On the other hand, when the temperature difference is small, the first fluid is accurately heated or cooled to the desired temperature by decreasing the driving amount of the heat source 30. Furthermore, the driving amount of the heat source 30 is also closely related to the flow rates of the first and second fluids, and a detailed description thereof will be described later.

In an exemplary embodiment of the present invention, the first fluid may be air used for air conditioning, the heat exchanger 10 may be a heater core for vehicle internal air conditioning through which the second fluid flows, the heat source 30 may be a heater, and the circulator 20 may be a pump. Thus, the driving amount of the heat source 30 denotes electric power W, and the circulation force of the circulator 20 denotes an RPM value.

Hereinafter, a method of controlling an air conditioner for an electric vehicle according to an exemplary embodiment of the present invention will be described with reference to the accompanying drawings.

Figure 2:
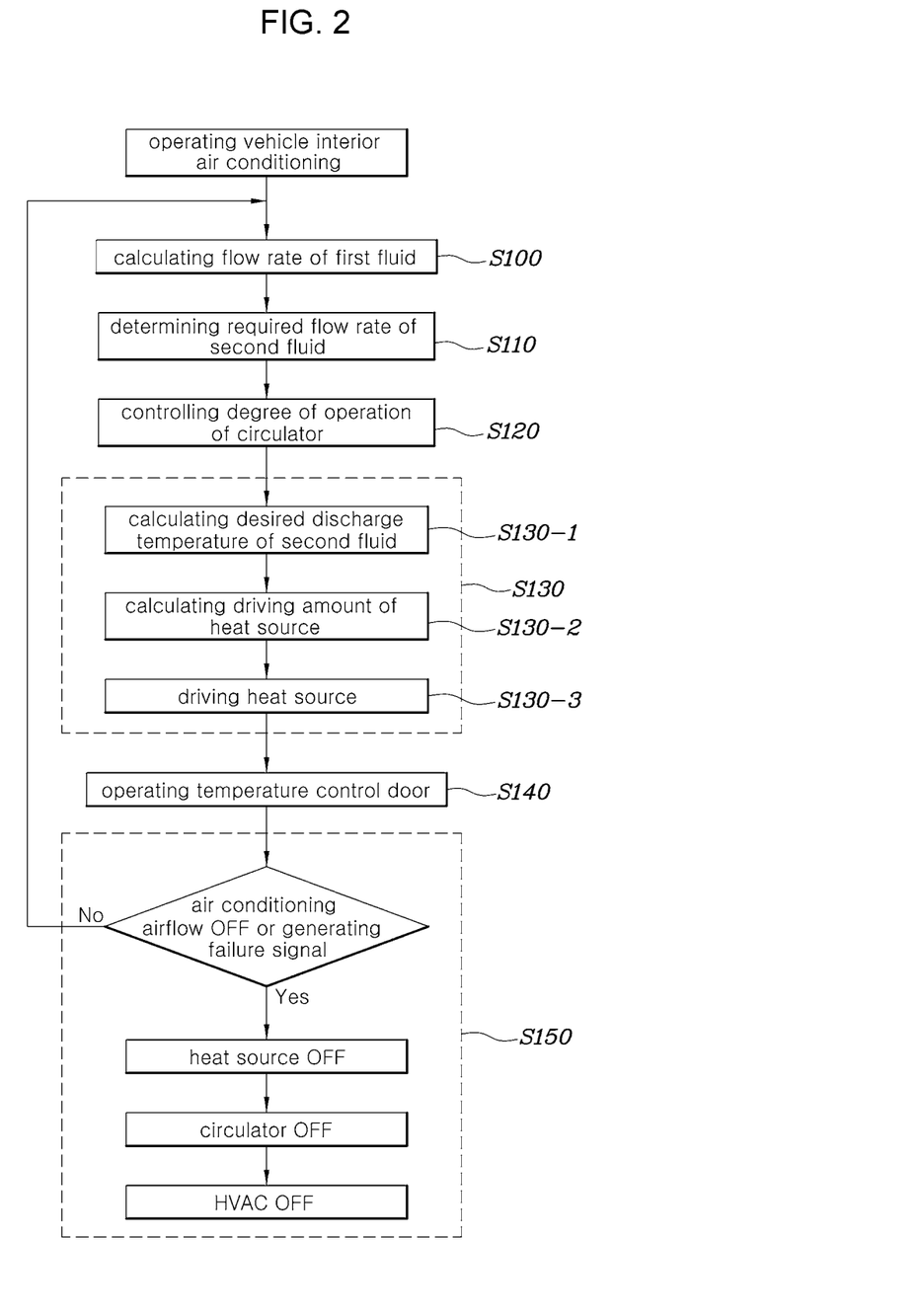
FIG. 2 is a flowchart showing a method of controlling the air-conditioning apparatus configured for the electric vehicle according to the exemplary embodiment of the present invention.

FIG. 2 is a flowchart showing the method of controlling the air-conditioning apparatus configured for the electric vehicle according to the exemplary embodiment of the present invention.

Referring to FIG. 1 and FIG. 2, the method of controlling the air conditioner for the electric vehicle according to an exemplary embodiment of the present invention may include determining a flow rate of a first fluid flowing through a heat exchanger 10 (S100); determining a required flow rate of a second fluid using the flow rate of the first fluid flowing through the heat exchanger 10 by use of a data map, with the flow rate of the first fluid as an input and the required flow rate of the second fluid as an output (S110); and controlling a level of operation of a circulator 20 according to the required flow rate of the second fluid (S120).

In other words, the controller 50 determines the required flow rate of the second fluid on the basis of the flow rate of the first fluid flowing through the heat exchanger 10, and controls the degree of operation of the circulator 20 according to the required flow rate of the second fluid, whereby the circulator 20 provides the flow rate of the second fluid that enables temperature control effect of the first fluid to be rapidly achieved and maximized.

Herein, the required flow rate of the second fluid may be determined to be a value proportional to the flow rate of the first fluid by use of the data map. This may be confirmed through the data map shown in FIG. 3.

The required flow rate of the second fluid may be determined as a flow rate value at which a time consumed for a current discharge temperature of the first fluid to reach a desired discharge temperature according to the flow rate of the first fluid with respect to the heat exchanger 10 is shortest.

In other words, referring to FIG. 4, in a state where the flow rate of the first fluid is fixed, the flow rate value of the second fluid at which the time consumed for the first fluid to reach the desired discharge temperature is shortest may be set as the required flow rate of the second fluid. Accordingly, it is possible for the system according to an exemplary embodiment of the present invention to rapidly and effectively control the first fluid and to minimize energy consumption.

Meanwhile, the method of controlling the air-conditioning apparatus configured for the electric vehicle according to an exemplary embodiment of the present invention may further include determining a driving amount of the heat source 30 on the basis of at least one of a temperature difference between a current inlet temperature and the desired discharge temperature of the first fluid with respect to the heat exchanger 10, the flow rate of the first fluid, and the flow rate of the second fluid, and driving the heat source 30 on the basis of the determined driving amount (S130).

In other words, as described above, an appropriate driving amount is determined to drive the heat source 30 and this makes it possible to rapidly and precisely control the temperature of the first fluid to the desired discharge temperature.

The driving the heat source 30 (S130) may include: determining a desired discharge temperature of the second fluid with respect to the heat source 30 on the basis of the temperature difference between the current inlet temperature and the desired discharge temperature of the first fluid with respect to the heat exchanger 10, on the basis of the flow rate of the first fluid, and on the basis of the flow rate of the second fluid (S130-1); determining the driving amount of the heat source 30 on the basis of the desired discharge temperature of the second fluid with respect to the heat source 30 (S130-2); and driving the heat source 30 on the basis of the determined driving amount (S130-3).

In other words, the controller 50 primarily determines the desired discharge temperature of the second fluid to be discharged from the heat source 30 on the basis of the temperature difference between the current inlet temperature and the desired discharge temperature of the first fluid with respect to the heat exchanger 10, on the basis of the flow rate of the first fluid, and on the basis of the flow rate of the second fluid (S130).

Herein, the desired discharge temperature of the second fluid with respect to the heat source 30 may be determined by multiplying the first rate of the first fluid, a specific heat of the first fluid, and the temperature difference between the current inlet temperature and the desired discharge temperature of the first fluid with respect to the heat exchanger 10, dividing a value that results from multiplication by the flow rate of the second fluid and a specific heat of the second fluid, and adding a value that results from division to a current inlet temperature of the second fluid.

This may be determined by the following equation.

$$\dot{m}_{air} \times C_{air} \times (T_{air-out} - T_{air-in}) = \dot{m}_{water} \times C_{water} \times (T_{water-out} - T_{water-in})$$

$\dot{m}_{air}$: Flow rate of first fluid
C_air: Specific heat of first fluid
T_air-out: Desired discharge temperature of first fluid
T_air-out: Current inlet temperature of first fluid
$\dot{m}_{water}$: Flow rate of second fluid
C_water: Specific heat of second fluid
T_water-out: Desired discharge temperature of second fluid
T_water-out: Current inlet temperature of second fluid This is an equation determined on the assumption that a heat release amount of the second fluid through the heat source 30 and a heat release amount of the first fluid through the heat exchanger 10 are the same.

Herein, data excluding the desired discharge temperature of the second fluid may be measured by a temperature sensor, may be values determined by the controller, or may be a constant used to determine the desired discharge temperature of the second fluid.

On the basis of the determined desired discharge temperature of the second fluid, the driving amount of the heat source 30 is determined (S130-2) and then the heat source 30 is driven (S130-3), realizing the desired discharge temperature of the first fluid.

Alternatively, the driving amount of the heat source 30 may be determined by use of a data map, with the flow rate of the first fluid and the temperature difference between the current inlet temperature and the desired discharge temperature of the first fluid with respect to the heat exchanger 10 as an input and the driving amount of the heat source 30 as an output.

In other words, because the flow rate of the second fluid is determined on the basis of the flow rate of the first fluid, it is possible to determine the driving amount of the heat source 30 by use of only data of the flow rate of the first fluid and data of the temperature difference between the current inlet temperature and the desired discharge temperature of the first fluid with respect to the heat exchanger 10.

Thus, the driving amount of the heat source 30 is determined by use of the data map acquired by mapping relationship between the flow rate of the first fluid and the temperature difference between the current inlet temperature and the desired discharge temperature of the first fluid with respect to the heat exchanger 10, whereby it is possible to more rapidly and simply derive the driving amount of the heat source 30.

Meanwhile, referring to FIG. 1 and FIG. 2, the method of controlling the air-conditioning apparatus configured for the electric vehicle according to an exemplary embodiment of the present invention may further include after the driving the heat source 30 (S130), controlling an opening ratio of a temperature control door 40 on the basis of a temperature difference between the current discharge temperature and the desired discharge temperature of the first fluid with respect to the heat exchanger 10 (S140), the temperature control door being provided at an upstream side of the heat exchanger 10 in a flow line 80 through which the first fluid flows.

In other words, the present invention controls convergence of the temperature of the first fluid to the desired discharge temperature through heat exchange with the second fluid. Herein, a slight error may occur to cause a difference between an actual discharge temperature and the desired discharge temperature of the first fluid.

Accordingly, the controller 50 controls the opening ratio of the temperature control door 40 on the basis of the temperature difference between the current discharge temperature and the desired discharge temperature of the first fluid and thus controls the temperature of the first fluid to be discharged in an HVAC system.

Herein, as shown in FIG. 1, the temperature control door 40 is provided at the upstream side of the heat exchanger 10 in the flow line 80 through which the first fluid flows, such that a degree to which the first fluid that bypasses or flows through the heat exchanger 10 is controlled.

Accordingly, when the current discharge temperature and the desired discharge temperature of the first fluid are different from each other, the degree to which the first fluid bypasses the heat exchanger 10 is varied through control of the opening ratio of the temperature control door 40. The present This makes it possible to enable the discharge temperature of the first fluid to accurately converge to the desired discharge temperature.

However, control of the opening ratio of the temperature control door 40 is performed only when the difference between the current discharge temperature and the desired discharge temperature of the first fluid occurs, minimizing control of the opening ratio to minimize cooling/heating energy consumption.

The method of controlling the air-conditioning apparatus configured for the electric vehicle according to an exemplary embodiment of the present invention may further include when a vehicle failure signal is generated or when vehicle internal air conditioning is required to be stopped, stopping operations of the heat source 30 and the circulator 20 and controlling to stop the vehicle internal air conditioning (S150).

According to the air-conditioning apparatus configured for the electric vehicle and the method of controlling the same having above described configurations, the flow rate of the second fluid is variably controlled on the basis of the flow rate of the first fluid, whereby it is possible to effectively reduce time and energy consumed for the second fluid to reach a desired temperature by the heater.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling an air-conditioning apparatus including a heat exchanger configured to perform heat exchange between a first fluid and a second fluid, while the first fluid and the second fluid flow separately from each other through a first line and a second line respectively, a heat source fluidically-connected to the heat exchanger through the second line through which the second fluid flows, wherein the second fluid circulates between the heat exchanger and the heat source through the second line and wherein the heat source is configured to heat or cool the second fluid, a circulator mounted to the second line and configured to impart a circulation force to the second fluid, such that the second fluid circulates between the heat exchanger and the heat source by the circulator, and a controller connected to the circulator and configured to determine a required flow rate of the second fluid by use of a flow rate of the first fluid flowing through the heat exchanger, and to control the circulator on a basis of the required flow rate of the second fluid, the method comprising:

determining, by the controller, the flow rate of the first fluid flowing through the heat exchanger;

determining, by the controller, the required flow rate of the second fluid using the flow rate of the first fluid flowing through the heat exchanger, by use of a data map so that the required flow rate of the second fluid is determined to be a value proportional to the flow rate of the first fluid; and controlling, by the controller, an operation of the circulator according to the required flow rate of the second fluid, wherein the required flow rate of the second fluid is determined as a flow rate value at which a time consumed for a current discharge temperature of the first fluid to reach a target discharge temperature according to the flow rate of the first fluid with respect to the heat exchanger is shortest.

2. The method of claim 1, further including:

determining, by the controller, a driving amount of the heat source on a basis of at least one of a temperature difference between a current inlet temperature and the target discharge temperature of the first fluid with respect to the heat exchanger, the flow rate of the first fluid, and the flow rate value of the second fluid, and driving, by the controller, the heat source on a basis of the determined driving amount.

3. The method of claim 2, wherein the driving of the heat source by the controller, includes:

determining a target discharge temperature of the second fluid with respect to the heat source on a basis of the temperature difference between the current inlet temperature and the target discharge temperature of the first fluid with respect to the heat exchanger, on a basis of the flow rate of the first fluid, and on a basis of the flow rate of the second fluid; and determining the driving amount of the heat source on a basis of the target discharge temperature of the second fluid with respect to the heat source.

4. The method of claim 3, wherein the target discharge temperature of the second fluid with respect to the heat source is determined by multiplying the first rate of the first fluid, a specific heat of the first fluid, and the temperature difference between the current inlet temperature and the target discharge temperature of the first fluid with respect to the heat exchanger, dividing a value that results from the multiplication by the flow rate of the second fluid and a specific heat of the second fluid, and adding a value that results from the division, to a current inlet temperature of the second fluid.

5. The method of claim 2, wherein the driving amount of the heat source is determined by use of the data map, with the flow rate of the first fluid and the temperature difference between the current inlet temperature and the target discharge temperature of the first fluid with respect to the heat exchanger and the driving amount of the heat source.

6. The method of claim 2, further including:
   after the driving of the heat source by the controller,
   controlling, by the controller, an opening ratio of a temperature control door on a basis of the temperature difference between a current discharge temperature and the target discharge temperature of the first fluid with respect to the heat exchanger, the temperature control door being provided at an upstream side of the heat exchanger in the first line through which the first fluid flows.

7. The method of claim 1, further including:
   when a vehicle failure signal is generated or when vehicle internal air conditioning is required to be stopped, stopping, by the controller, operations of the heat source and the circulator, and controlling, by the controller, to stop the vehicle internal air conditioning.

* * * * *